(12) United States Patent
Doemens et al.

(10) Patent No.: US 7,212,278 B2
(45) Date of Patent: May 1, 2007

(54) METHOD AND DEVICE FOR RECORDING A THREE-DIMENSIONAL DISTANCE-MEASURING IMAGE

(75) Inventors: Günter Doemens, Holzkirchen (DE); Peter Mengel, Eichenau (DE)

(73) Assignee: Siemens Aktiengesellschaft, Munich (DE)

( * ) Notice: Subject to any disclaimer, the term of this patent is extended or adjusted under 35 U.S.C. 154(b) by 88 days.

(21) Appl. No.: 10/485,996

(22) PCT Filed: Aug. 1, 2002

(86) PCT No.: PCT/DE02/02843

§ 371 (c)(1),
(2), (4) Date: Feb. 5, 2004

(87) PCT Pub. No.: WO03/016944

PCT Pub. Date: Feb. 27, 2003

(65) Prior Publication Data

US 2004/0233416 A1    Nov. 25, 2004

(30) Foreign Application Priority Data

Aug. 6, 2001  (DE) ............... 101 38 531
Oct. 31, 2001 (DE) ............... 101 53 742

(51) Int. Cl.
*G01C 3/08* (2006.01)

(52) U.S. Cl. ............ 356/5.01; 356/5.02; 356/5.03

(58) Field of Classification Search ......... 356/5.01
See application file for complete search history.

(56) References Cited

U.S. PATENT DOCUMENTS

| 4,915,498 A | * | 4/1990 | Malek ............... 356/5.04 |
| 4,928,152 A | * | 5/1990 | Gerardin ............. 356/5.09 |
| 5,148,175 A | * | 9/1992 | Woolfolk ............. 342/95 |
| 5,291,262 A | * | 3/1994 | Dunne ............... 356/5.06 |
| 5,625,446 A | * | 4/1997 | Bedard .............. 356/3.08 |
| 6,057,909 A | * | 5/2000 | Yahav et al. .......... 356/5.04 |

FOREIGN PATENT DOCUMENTS

WO    WO99/34235    * 11/1998

* cited by examiner

*Primary Examiner*—Thomas H. Tarcza
*Assistant Examiner*—Luke D. Ratcliffe
(74) *Attorney, Agent, or Firm*—Morrison & Foerster LLP

(57) ABSTRACT

The invention relates to methods and devices for recording three-dimensional distance-measuring images of an object surface by measuring light propagation time using a short-term integrated photodetector. For starting a light-induced pulse on the transmission side, a trigger signal is produced that is at the same time used on the receiving side for opening at least one integration window for receiving backscattered light-induced pulses with a predetermined time delay. A predetermined event such as a maximum or a zero crossing is detected which, by its interval relative to the integration windows, determines a trigger delay. The trigger delay is correlated with the light propagation time and allows calculation of the object point distance d.

18 Claims, 7 Drawing Sheets

METHOD AND DEVICE FOR RECORDING A THREE-DIMENSIONAL DISTANCE-MEASURING IMAGE

CLAIM FOR PRIORITY

This application claims priority to International Application No. PCT/DE02/02843, which was published in the German language on Feb. 27, 2003, which claims the benefit of priority to Germany Application Nos. DE 101 38 531.5 and DE 101 53 742.5, which were filed in the German language on Aug. 6, 2001 and Oct. 31, 2001, respectively.

TECHNICAL FIELD OF THE INVENTION

The invention relates to a method and device for recording a three-dimensional distance-measuring image of an object, and in particular, by measuring light propagation times.

BACKGROUND OF THE INVENTION

The rapid, robust recording of three-dimensional images is becoming increasingly important in many fields, particularly in sensor technology. Because of the measurement basis required for the trigonometric calculation of a distance value, known triangulation methods are only suitable for distances of up to about 2 m and are of limited application. There is a great variety of applications for cost-effective three-dimensional (3D) measurement systems for recording and evaluating, particularly for measuring larger areas of—for example—from 20 cm up to 50 m, for example in the fields of automotive engineering, navigation, building systems, security and alarm systems, or automation engineering. At present, the measurement of larger 3D scenes and 3D objects can only be done statically by means of photogrammetry or by scanning with a 3D laser radar, with correspondingly high expenditure in terms of cost and time.

In German patent application no. 198 33 207, a method is described in which the extremely short integration time of a CMOS photosensor, which is—for example—30 ns, is used in combination with a likewise short laser pulse, in order to generate distance-measuring images quickly and economically by evaluating light propagation time measurements. Concurrently with the emission of the laser pulse, a measurement window is opened on the CMOS image sensor via a trigger and the light intensity of the laser pulse is detected following reflection on the object to be measured in two consecutive measurements with the integration times $T_1$ and $T_2$. The propagation time $T_0$, and thus the distance to the object point, is precisely calculated by measuring the integrated intensity $U_1$ and $U_2$ within two measurement windows with integration times $T_1$ and $T_2$, according to the arithmetic formula:

$$d = \frac{1}{2}c\frac{U_2 T_1 - U_1 T_2}{U_2 - U_1}$$

A laser light source is used as the illumination. It is synchronized with the start of the integration time $T_1$ and $T_2$ and has short rise times (approx. 1 ns) and an output power which is as constant as possible.

However, because of the difference and quotient formation, the application of this formula requires a measurement to be carried out with light intensities whose integrated photoelectric voltages must be significantly higher than the upper noise limit of the CMOS image sensor. Even though it is possible for the results of numerous laser pulse illuminations to be added together, any improvement in the signal/noise ratio can only be achieved using the root of the laser pulse count. Furthermore, final rising edges of the laser pulse and inevitable non-linearities in the integration behavior of the CMOS image sensor result in measurement errors that require additional calibration procedures.

SUMMARY OF THE INVENTION

The invention provides a method and device for recording a three-dimensional distance-measuring image by measuring light propagation times, in which an increased distance measuring range is achieved, the sensor signal is independent of the shape of the light-induced pulses, and a lower light output for the transmission side is facilitated.

One embodiment of the invention uses a CMOS photosensor with a high number of pixels with short-term integration, in which the integration time can be adjusted pixel by pixel, and a light-induced pulse illumination for generating a 3D distance-measuring image. The light source used for this purpose is uniformly controllable, yet may also be of pointed or flat design. A new measurement principle is used for determining the distance values with the aim of facilitating reliable light propagation time measurements up to the noise level of the CMOS sensor. For this purpose, the emission of light-induced pulses on the transmission side by the trigger signals and the opening of the electronic shutter, which is synonymous with the opening of a time window, on the receiving side, is controlled on the CMOS sensor. This takes place on the receiving side with a gradually increasing time delay, for example via a delay line, in increments of—for example—1/10 nanoseconds. In this way, the emitted laser pulse and the integration window are moved toward one another in time as the time delay increases, with at least one light-induced pulse being transmitted with each gradually increasing trigger delay. To reduce the laser pulse output, multiple light exposures are applied in all trigger delays if possible and a signal evaluation is carried out at the end. The integrated sensor signals measured in this way are stored in a processing unit.

If the preset delay correlates with the light propagation time of the corresponding object point, there is—according to one solution—a maximum level produced in the integrated signal, which can be calculated using interpolation methods, with high sensitivity and precision, from the values stored in the processing unit. The 3D distance value can thus be defined on the basis of the trigger delay calculated for the maximum conformance between time window and back-scattered light-induced pulse, and the result, the light propagation time, is obtained largely independently of the shape of the light-induced pulse and of the linearity characteristics of the CMOS image sensor. In other words, the distance to the object point is obtained from the number of delay stages that have been activated up until this status. Here the laser pulse and integration time are of approximately equal duration in order to obtain as pronounced a correlation maximum as possible. The integration time, however, is limited to about 30 ns for reasons relating to circuitry.

In another embodiment, the short-term integration of a photo receiver is used, and the gradually implemented time delay of a laser pulse relative to the integration windows on the receiving side. The short-term integration, however, is carried out twice with the same integration time, i.e. with integration windows of equal length, either parallel or in series. This occurs in relation to two successively actuated and immediately consecutive integration windows. In this case, the parallel method means that illumination and detection takes place at the same time for the front and rear illumination windows. The delayed triggering (e.g. due to a time delay) of the integration windows relative to the laser pulse on the transmission side, is carried out without change. The serial treatment provides for an evaluation with or by the first integration window, whereupon the second, subsequent phase with reference to the second integration window, is evaluated and the integrated scores that are stored are compared with one another. For this case, the evaluation is the duration of the laser pulse briefly in relation to the duration of the integration time or the length of the integration window. A laser pulse may—for example—be 4 ns long, whereas the integration time, in contrast, may for example last for 30 ns. Using this evaluation method, the object point distance is also determined by the light propagation time calculated. This results from the search for an event on the receiving side, which is as uniquely quantifiable as possible, and which can be assigned to a specific, incrementally adjustable trigger delay. In the first variant a maximum value for the coincidence of laser pulse and integration window on the receiving side is searched for. In the evaluation method described here the point in time is detected at which the light-induced pulse is in transfer from the first to the second integration window. For this case, where the backscattered light-induced pulse falls on the receiver symmetrically with one half in the first integration window and the other half in the second integration window, equal light proportions or voltages are produced. The difference between these two voltages, which is approximately zero, can also be evaluated. Since this zero crossover is very steep, calculation is relatively straightforward.

Multiple illuminations are used to ensure that critical laser outputs do not exceed laser protection regulations. However, an essential benefit that can be attained in this way lies in the accumulation of several light-induced pulses arriving in succession at the integration cells. These are integrated in each light-induced pulse by the corresponding opening and closing of the integration cells, so that a sufficiently high signal level, which essentially depends on the noise range, is present at each integration cell. Thus it is possible, for the many integration cells whose local distribution corresponds to the pixel distribution of the image, to obtain a quantity of voltage signals, which, on the whole, can easily be evaluated. Since the time-consuming process of reading the multitude of integration cells takes place at the end of a multiple illumination, the evaluation is done relatively quickly.

A further advantage lies in the collinear guidance of the light beams on one axis.

BRIEF DESCRIPTION OF THE DRAWINGS

Exemplary embodiments are described below with reference to the figures, in which.

DETAILED DESCRIPTION OF THE INVENTION

Figure 1:
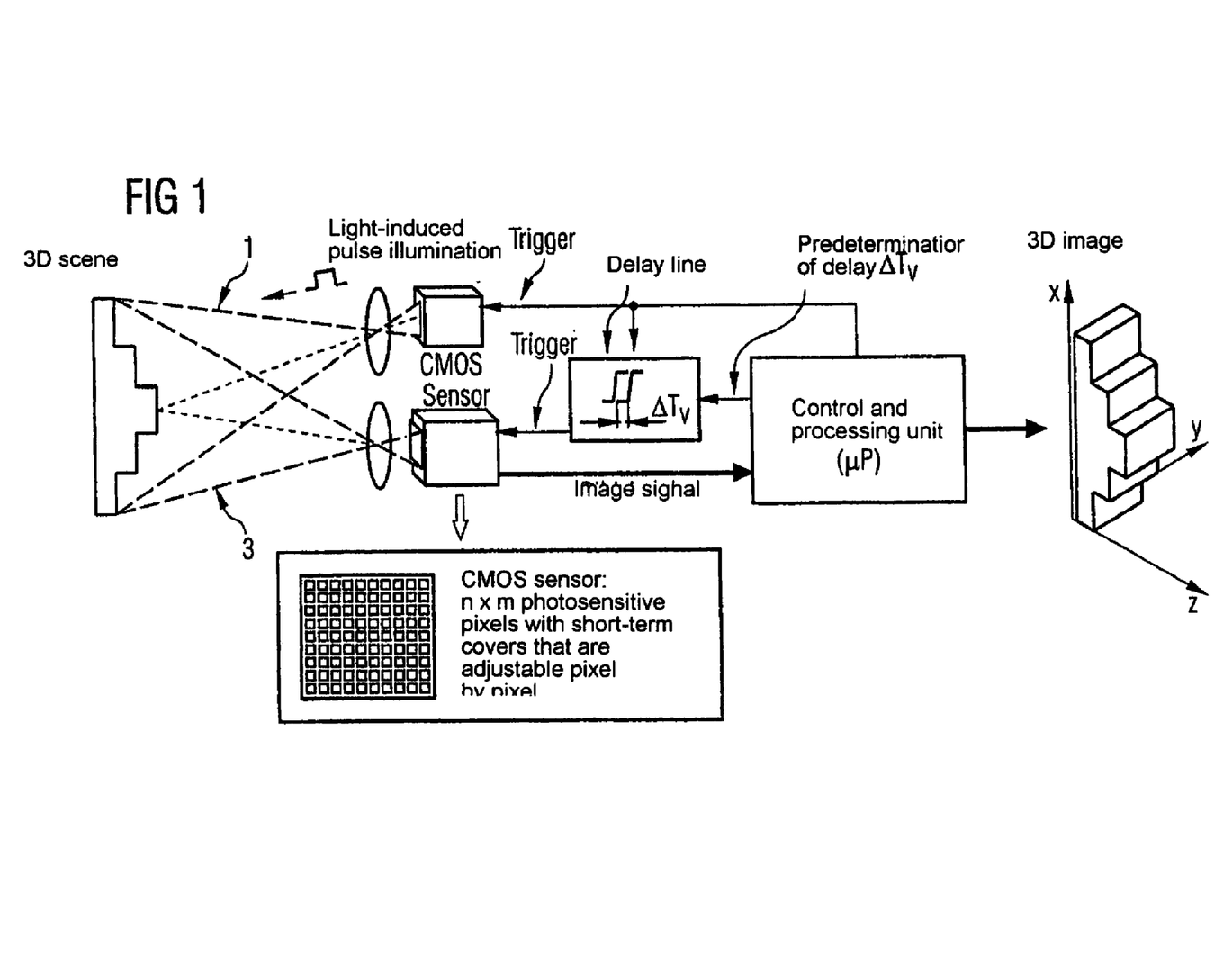
FIG. 1 shows a measuring device for generating three-dimensional distance-measuring images.

The total 3D scene to be measured is illuminated for an image record serially with short light-induced pulses with starting times in nanoseconds. The emission of the light-induced pulse is started via a trigger which is predetermined for each measurement process by a control and processing unit (FIG. 1). A part of the trigger signal is simultaneously guided via a programmable delay line and serves as the starting signal for opening the electronic shutter on the CMOS photosensor according to a predetermined time delay $T_v$ with increments in the 1/10 nanosecond range, said shutter being closed again after a certain brief integration time (for example 30 ns). This is synonymous with the opening of a time window for receiving backscattered light-induced pulses 3. Incoming light-induced pulses may be integrated in an opened time window. The integration time, i.e. the duration that the window is open, is ideally selected as being equal to the duration of a light-induced pulse.

Figure 2:
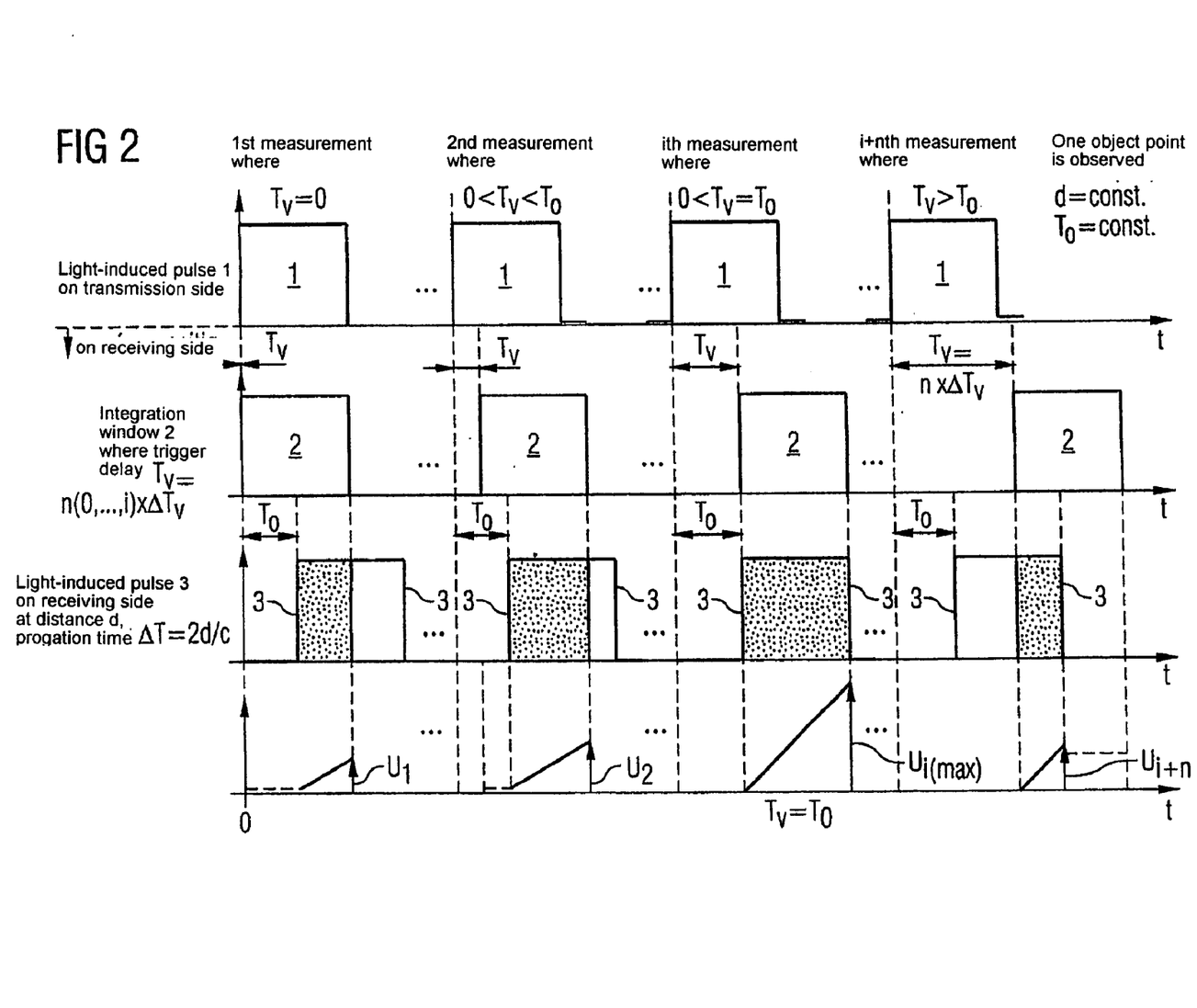
FIG. 2 shows the procedural principle of correlated light propagation time measurement.

The emitted light-induced pulses are scatted onto the objects of the 3D scenes and the reflected light is captured via a corresponding lens on the CMOS sensor within the integration period of the electronic shutter. On the basis of the various distances of different object points from the sensor, light-induced pulses corresponding to the locations are received in a variable propagation time delay $T_0$. For a specific, single object point at the distance d, this produces an integrated sensor signal $U(T_0, T_v)$ on the corresponding pixel on the receiving side from the timing overlap between the CMOS integration window 2 and the reflected light-induced pulse 3 (mathematical convolution function) in the currently set trigger delay $T_v$ (FIG. 2).

If the trigger delay $T_v$ is now increased in increments $n \times \Delta T_v (=T_v)$ starting with the value 0, the sensor signal $U(T_0, T_v)$ also increases initially until the trigger delay $T_v$ is equal to the light propagation time $T_0$ for this pixel. In this case there is a maximum overlap between reflected laser pulse 3 and measurement window 2 of the CMOS sensor, so that here there is a maximum level for the integrated intensity. If the trigger delay $T_v$ is further increased in addition, the range of time overlap—and thus the integrated sensor signal (voltage U)—is again reduced.

Thus a 3D distance-measuring image can be generated from simple intensity comparison measurements with determination of extreme values using very low light outputs. The control and processing units store, for a range of variable trigger delays $n \times \Delta T_v$ (running index n=0 to i), the corresponding sensor signals $U(T_0, T_v)$ of the entire CMOS photo sensor and then calculates the maximum value $U(T_0, T_v)_{max}$ for each individual pixel. The light propagation time $T_0 = i \times \Delta T_v$ (see FIG. 2) for this pixel can be determined from the corresponding trigger delay $T_v$, and hence the distance d of the corresponding object point is $d = c \, T_0/2$ (c–speed of light)

Figure 3:
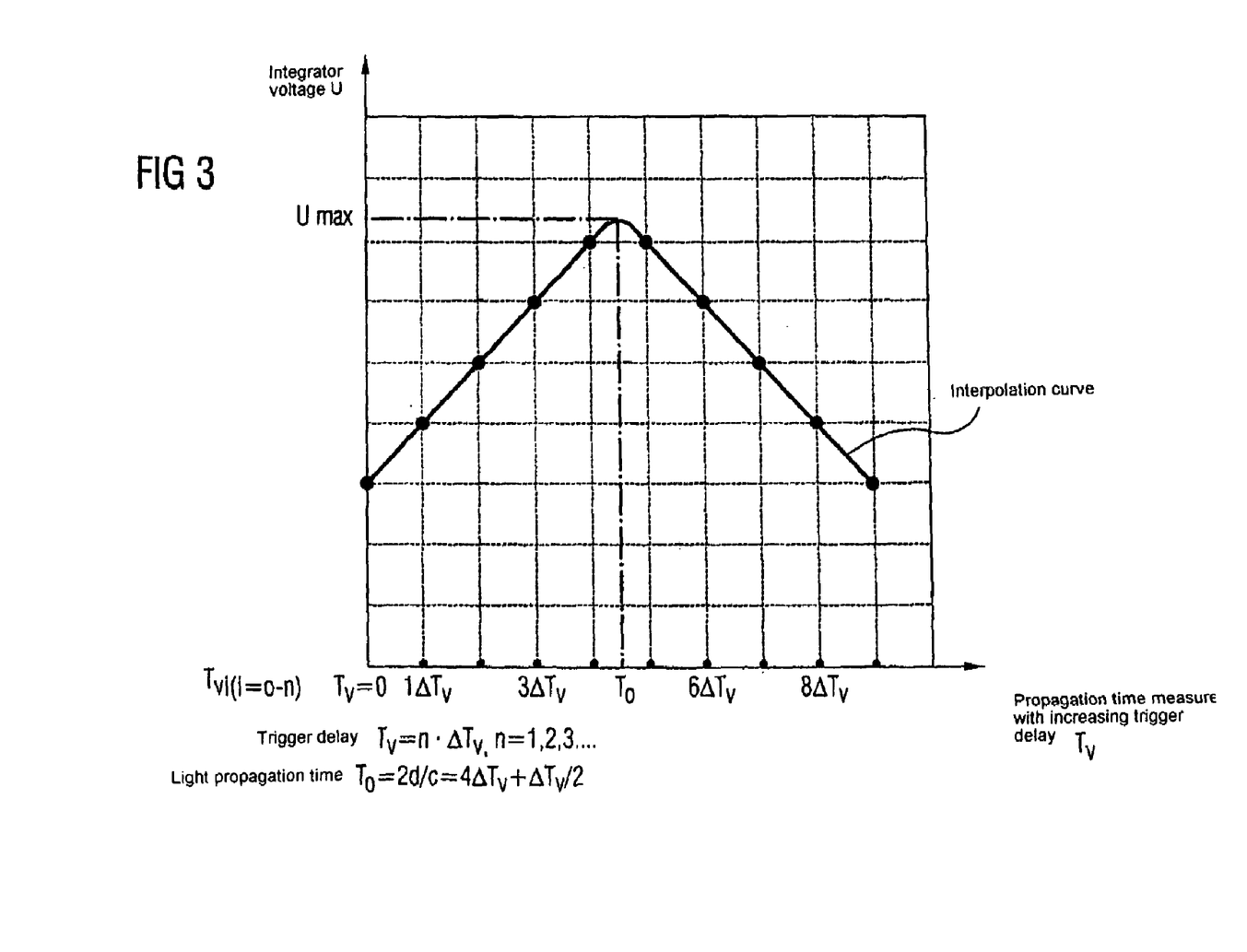
FIG. 3 shows the interpolation for calculating the maximum value for determining the propagation time delay $T_0$.

In general, the light propagation time $T_0$ will not be exactly equal to the incrementally adjusted trigger delay $n \times \Delta T_v$, but will have an interim value as shown in FIG. 3. It is therefore proposed that interpolation methods be used for determining the maximum value. Linear methods are adequate for ideal pulse shapes. Under actual conditions, however, it is beneficial to use costly interpolation methods on the basis of quadratic polynomials or splines. The result for the light propagation time $T_0$ can thus be determined not only from the maximum value but possibly also from other shape criteria, intersecting points, etc. of the interpolation curve. Since, in the measurement of light-induced pulses 3 with variable propagation times $T_0$, the interpolation curves of the signal values only move their position with reference to the adjusted trigger delays $T_v$, an evaluation can also be carried out by comparison with a stored reference curve that was recorded previously with a known distance value d. Thus, the result of the distance determination can be made more accurate using interpolation and reference comparison methods and the number of trigger delays to be adjusted for a required distance resolution can be reduced.

For an electronic trigger delay, optimally programmable delay lines can be used in CMOS technology. For example, it is possible to obtain delay elements with a standard increment of 0.25 ns and 256 programmable settings. Increments of 0.1 ns will be possible in future developments. This will enable distance resolutions of 1.5 cm to be achieved, which—through interpolation—can be improved still further to 0.5 cm.

The control and processing unit shown in FIG. 1 may be integrated partially or completely within the electronic control units of the CMOS sensor.

Distance-measuring images with approximately one thousand pixels are already sufficient for room supervision and security monitoring in most cases. If the generation of distance-measuring images with 0.5% resolution (5 cm) is required for a distance measurement range of 10 m, then— with interpolation—approximately 100 image recordings with delay increments of $\Delta T_v$=0.6 ns will be required. Assuming a pixel data rate for the CMOS sensor of 5 MHz, this results in a measurement time of 1000×0.2 µs×100=20 ms for the capture of the entire 3D distance-measuring image ($\cong$50 3D images/s).

In addition, when measuring using an instantaneously adjusted trigger delay $T_v$, several more light-induced pulses may in the same way be added together on the chip. This enables further improvement of the signal/noise ratio to be achieved and an adaptive adjustment of the multiple illumination to be carried out according to object reflectivity.

The methods of differential short-term integration on CMOS sensors, which are explained in greater detail on the basis of FIGS. 4 to 7, incorporate the features described below.

The proposed method likewise uses the short-term integration of a photodetector and the gradually implemented delay of a laser pulse relative to one or more integration windows. In contrast to the first solution to the proposed object, the short-term integration is, however, implemented twice in parallel or in series with the same integration time $T_i$, whereby the two integration windows 21,22 of equal length are actuated in direct succession and thus have a common time limit.

Figure 4:
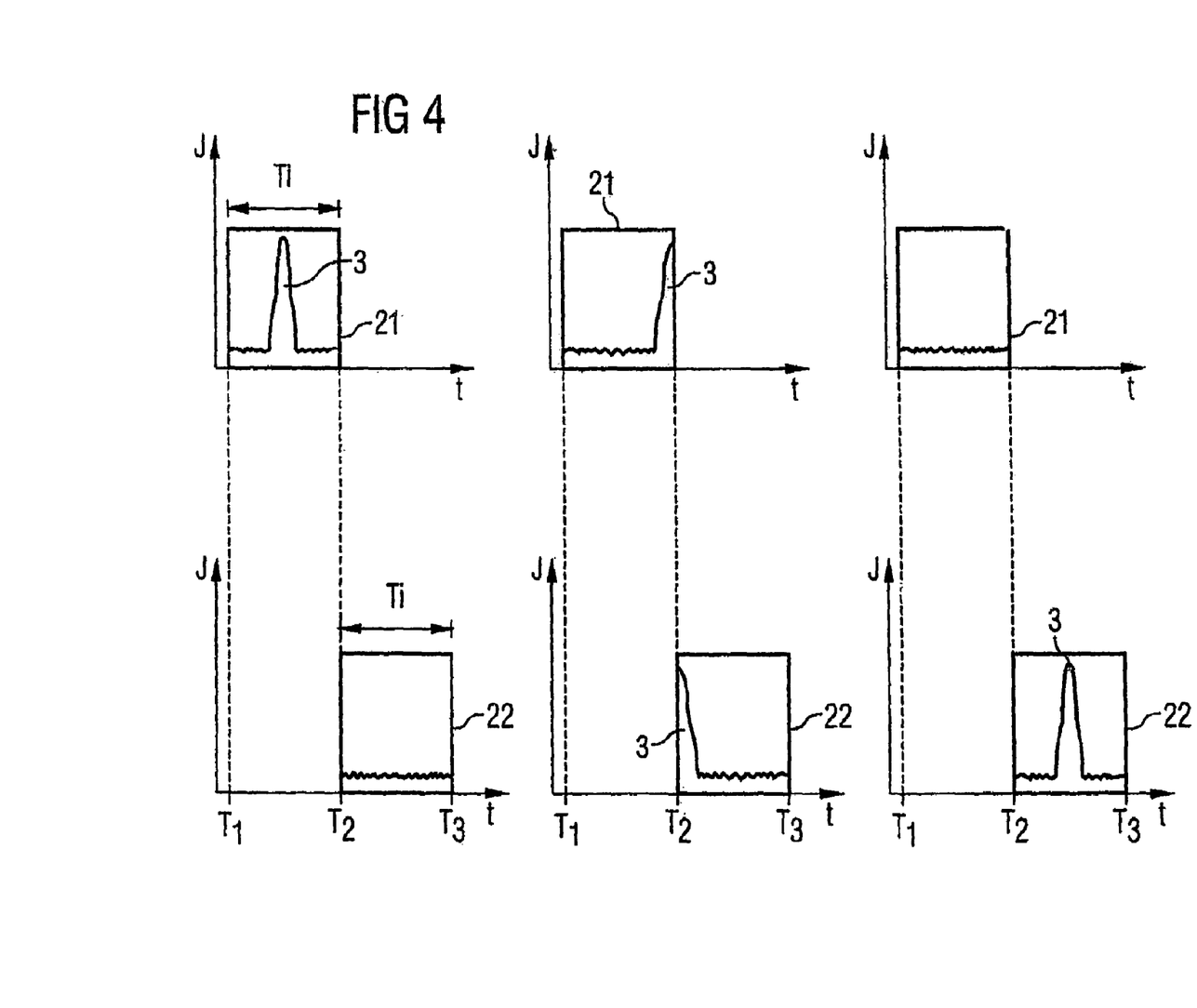
FIGS. 4 to 7 illustrate the generation of distance-measuring images with differential short-term integration on CMOS sensors.

The duration of the laser pulse is preferably brief compared to the integration time $T_i$. The measurement process for the light propagation time now includes the emitted laser pulse is moved relative to the integration time $T_i$ by the delay time increments $\Delta T_v$. In the optoelectronic conversion the integral value of the voltage U with a progressive trigger delay $T_v$ does not change as long as the laser pulse falls completely within one of the two integration windows 21, 22. FIG. 4 shows this status, in which the laser pulse in the left-hand half of the image is located in the first integration window 21 and the one in the right-hand half of the image emerges in the second integration window 22. In the middle diagram in FIG. 4, the laser pulse 3 is half in the first and half in the second integration window. Shortly before this transition the integral value of the voltage U of the received light intensity is correspondingly reduced by the deviation in time from the relevant integration window, while the integrated light intensity increases correspondingly in the directly adjacent integration window. If a certain trigger delay corresponds to the relevant distance d to the object location, the voltages measured in the two integration windows are of equal magnitude. The difference between them is approximately zero. This zero crossover is very steep and can therefore be accurately calculated. Furthermore, simple interpolation methods enable a significant degree of accuracy to be achieved.

Figure 7:
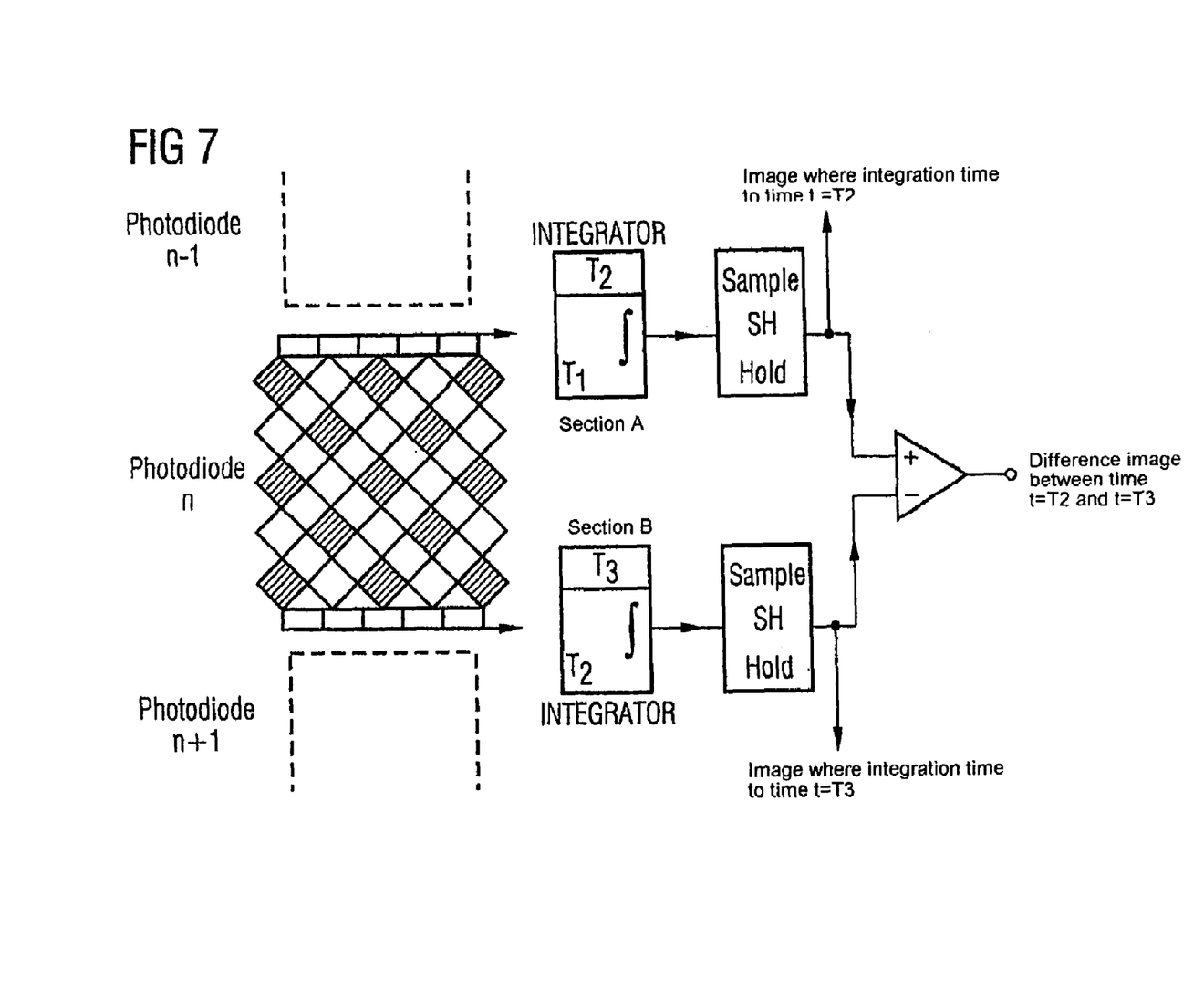

FIG. 7 is a graphical illustration for evaluating the shortness of a signal where there is differential short-term integration on the CMOS sensor. The function shown in the voltage/time diagram is constructed by stringing measurement points together, whereby a single measurement point comes from one measurement with constant trigger delay $T_v$. This trigger delay is made up of an initial value or zero value added to the delay time increment $\Delta T_v$ or a multiple thereof. For each value of the trigger delay that remains incrementally constant, a measurement point is produced. The described multiple layering may take place within the recording of a measurement point so that the integration is carried out at the end of this multiple illumination.

Figure 5:
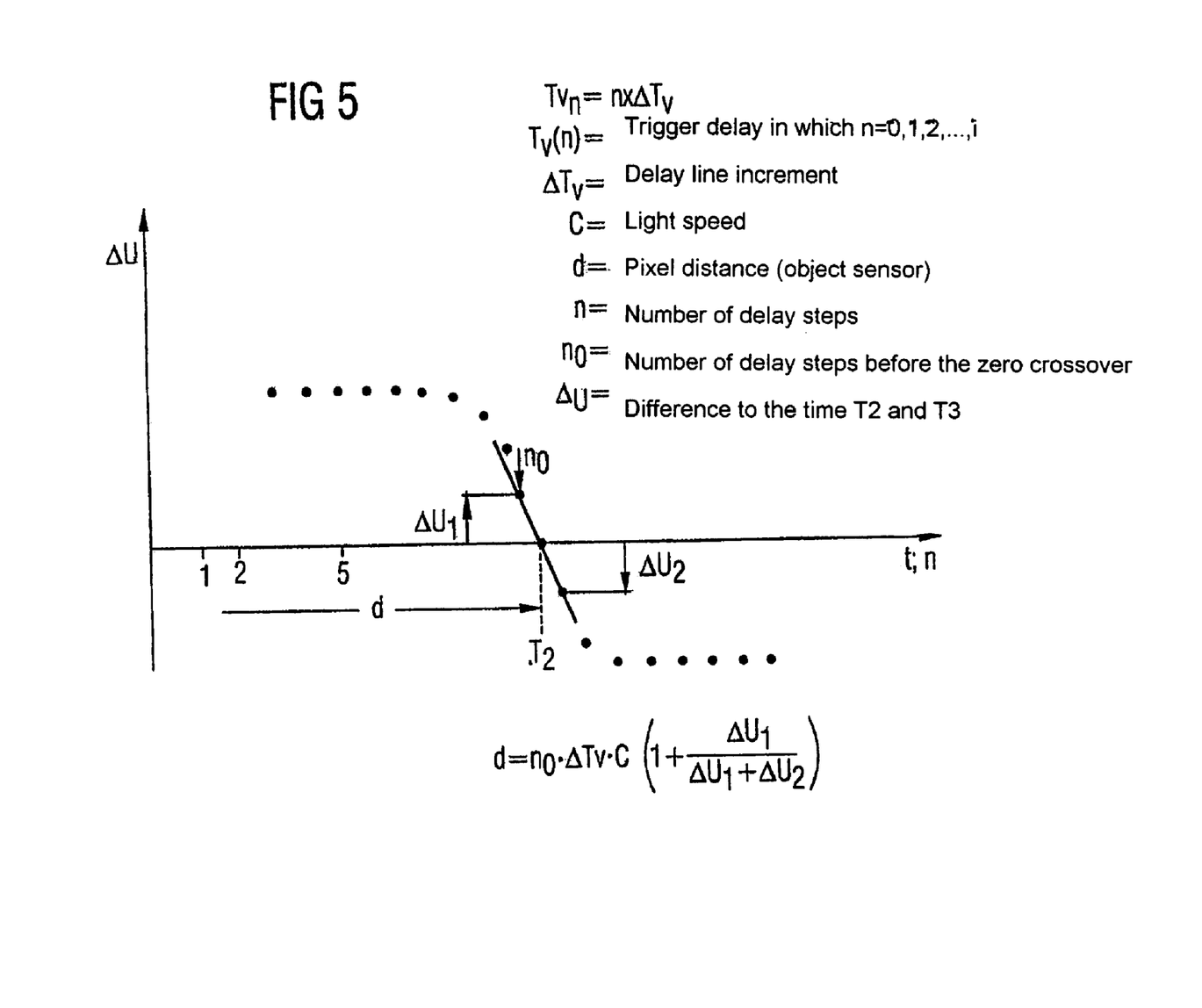
Figure 6:
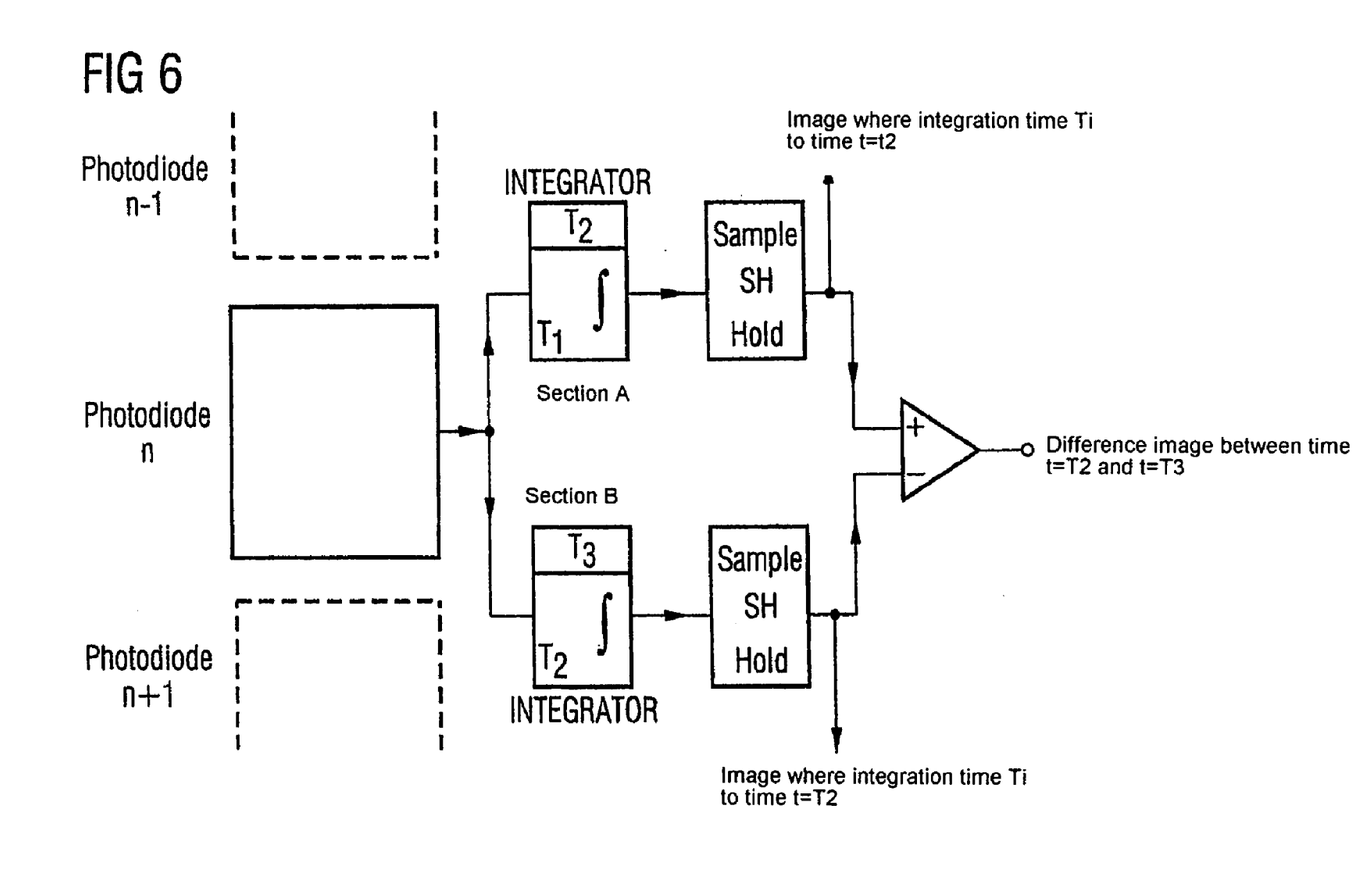

FIG. 5 further shows that a voltage from one of the two directly successive integration windows is negatively set, so that the function has a zero crossover. The reference character $n_0$ designates the number of the delay stage before the zero crossover. The equation shown in FIG. 5 for the pixel distance d, the distance between object and sensor, includes the value $n_0$. The zero crossover of the function shown in FIG. 5 is therefore normally calculated via an interpolation method. If FIGS. 4 to 7 are viewed at the same time the benchmark time figures of the integration windows 21, 22 are named and clarified by the time points $T_1$, $T_2$ and $T_3$. This means that the first integration window 21 is opened in $T_1$ and closed in $T_2$. The second integration window 22 is opened in $T_2$ and closed in $T_3$. FIGS. 6 and 7 each refer to one of many photodiodes that record and forward light-induced pulses captured for a pixel in an optoelectronic chip. The short-term integration via directly successive time windows of equal length is associated with the trigger delay on the receiving side, which gradually increases by equal amounts. For each time-constant trigger delay, there occurs at least one illumination and one integration with reference to a time window. For each stage with constant trigger delay, multiple illuminations in particular are provided. The detection of the trigger delay value which can be converted into a distance value via the evaluation by means of light propagation time, takes place by gradual scanning of a received light-induced pulse by the two directly successive integration windows 21, 22. The evaluation is best carried out following the digitization of the analog voltage signal values. The advantages of this method lie in the absolutely identical integration within the two time windows. The illumination may come from different laser pulses, whose characteristic may deviate slightly from one another.

FIG. 6 shows an evaluation circuit which permits parallel evaluation with regard to construction. Each integration window is assigned an identically constructed integrator. The resulting signals are placed in each case via an interim buffer SH onto a difference amplifier, by which means a difference image can be generated. Since, however, the time ranges for integration are strung together during measurement, the timing of integrations is staggered. Thus the time frame from $T_1$ to $T_2$ corresponding to the first integration window 21 is taken into account in section A, and the frame for the integration window 22 in the corresponding period from T2 to T3 is taken into account in section B.

FIG. 7 shows the same basic procedure, but with the photodiode arranged in a way that permits parallel integration. The photodiode is divided into two separate sections so that each section receives the same optical intensity. Rhomboid patterns, as shown in FIG. 7, are particularly suitable for this purpose. The division of the photodiode into two individual photodiodes means that the two integration processes take place entirely without interaction. The circuit according to FIG. 7 thus permits the parallel evaluation of two sections present on all photodiodes, which are fed to an integrator. One time-based integration again relates to the first integration window 21 in the timeframe from $T_1$ to $T_2$ and the second integration relates to the second integration window in the time from $T_2$ to $T_3$. The further evaluation takes place in the same way as shown in FIG. 6.

Using a method according to the invention, measurement accuracy with regard to distance measurement can be improved threefold relative to the prior art. The laser output hitherto required can be reduced by a factor of 10.

What is claimed is:

1. A method for recording a three-dimensional distance-measuring image of an object by measuring light propagation times, comprising:
   transmitting light pulses from a light source to an object surface;
   receiving backscattered light pulses by a photodetector with short time integration;
   calculating an object point distance in each case from light propagation time of the light pulses, wherein a trigger signal produced for starting a light pulse is applied at a same time on a receiving side with a trigger delay that increases gradually in time increments for opening at least one integration window for receiving the backscattered light pulses;
   generating a correlation function from overlapping in time domain of the integration window and the backscattered light pulse, and
   in each predetermined trigger delay, a multiple illumination is implemented with an integration window opened for each illumination for cumulative integration of reflected light pulses.

2. The method according to claim 1, wherein
   the trigger signal on the receiving side is used for the repeated opening of a single integration window for receiving the backscattered light pulses, and
   the distance of an object point is calculated once a maximum value for an integrated voltage is reached, from the corresponding trigger delay, which is approximately equal to the light propagation time.

3. The method according to claim 2, wherein the duration of the integration window is equal to the duration of a light pulse.

4. The method according to claim 1, wherein
   the trigger signal on the receiving side is used for the repeated opening of a first integration window, followed by a second integration window, in each case for receiving the backscattered light pulses, and
   the short time integration for the two integration windows is carried out in parallel or in series with equal integration time, the duration of the light pulses is small relative to the integration time, and the distance of the object point can be calculated if the light pulse is positioned on a shared boundary between the first and second integration windows and equal amounts of the integrated voltages relating to the two integration windows are present, such that the corresponding trigger delay corresponding to the light propagation time is converted into the distance value.

5. The method according to claim 4, wherein, instead of comparing the amounts of the integrated voltages, one voltage is negatively set and a zero crossover between the two voltages assigned to successively actuated integration windows is detected.

6. The method according to claim 4, wherein photodiodes used as sensor elements are divided into two separate sections, with each section receiving a same optical intensity.

7. The method according to claim 1, wherein if a reflectivity of an object or individual object points is heavily differentiated, a number of multiple illuminations is selected such that integrated intensity values are near a saturation region for a maximum number of object points.

8. The method according to claim 1, wherein light from a laser or laser diode is used for illumination.

9. The method according to claim 1, wherein the trigger delay for the first light pulse of an image recording on the receiving side is equal to zero.

10. The method according to claim 1, wherein a duration of an integration window is constant.

11. The method according to claim 1, wherein the trigger delay increment is less than 0.25 nanoseconds.

12. The method according to claim 2, wherein interpolation is used to determine maximum values and/or zero crossovers of the voltage.

13. The method according to claim 12, wherein interpolation is used based on quadratic polynomials or spline functions.

14. The method according to claim 1, wherein a comparison with a previously stored reference curve with a known distance is carried out in order to evaluate voltages.

15. The method according to claim 1, wherein the trigger delay occurs through use of programmable delay lines.

16. A device for recording a three-dimensional distance-measuring image of an object by measuring light propagation times, comprising:
   a light pulse illumination with a single light source for illuminating the object surface;
   a CMOS sensor with a plurality of sensor points as the photodetector, with pixel-based short time integration;
   a control and processing unit, that controls at least triggering on a transmission side and a receiving side and calculates distance values from voltage signals,
   a delay, gradually incrementing the delayed time, line between the control and processing unit and the CMOS receiving sensor for preparing an incrementally adjustable trigger delay; and
   trigger cables configured to the light pulse illumination and to the CMOS receiving sensor.

17. The device according to claim 16, wherein the control and processing unit is integrated at least partially in an electronic unit of the CMOS receiving sensor.

18. The device according to claim 17, wherein the voltage values of photodiodes are fed in parallel or in series, then stored in interim buffer units where they are optionally fed to a difference amplifier and then to a processing unit.

* * * * *